Oct. 27, 1936.  J. MIHALYI  2,058,484

BASE TYPE RANGE FINDER

Filed May 23, 1935

INVENTOR.
Joseph Mihalyi
BY
ATTORNEYS

Patented Oct. 27, 1936

2,058,484

UNITED STATES PATENT OFFICE 2,058,484

BASE TYPE RANGE FINDER

Joseph Mihalyi, Rochester, N. Y., assignor, by mesne assignments, to Eastman Kodak Company, Jersey City, N. J., a corporation of New Jersey Application May 23, 1935, Serial No. 23,069

3 Claims. (Cl. 88—2.4)

This invention relates to range finders for determining the distance an observed object is spaced from the point of observation and more particularly to a small portable base type range finder in which an adjustable element is employed to bring into coincidence two partial views of an object whose distance is being determined.

It is an object of the invention to provide a small compact range finder of simple and inexpensive construction, which will measure relatively short distances accurately and in which range scales are provided so that the distance measured may be read directly while viewing an object through the eye-piece or if desired may be noted after the finder has been removed from the eye.

The invention resides in certain improvements in construction and combinations of parts, as will be hereinafter more fully described in connection with the accompanying drawing, and the novel features will be pointed out in the appended claims.

The finder of the present invention is of the type in which two simultaneous images of an object are formed and the distance is measured by noting the amount of adjustment necessary to bring these images into register.

Figure 1:
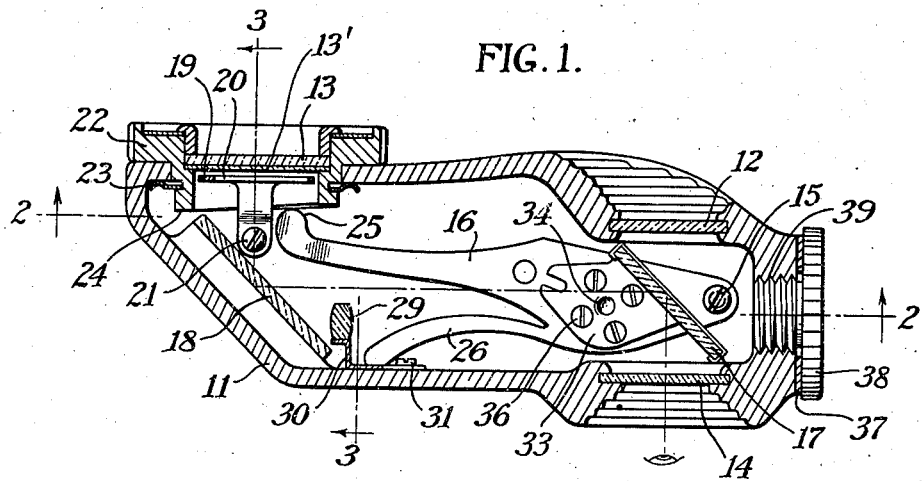
Fig. 1 is a side elevation in section of a range finder constructed in accordance with and illustrating the preferred embodiment of the invention.
Figure 2:
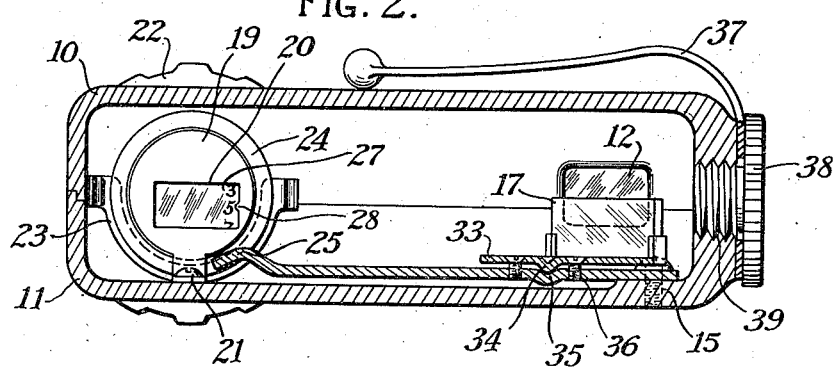
Fig. 2 is a section on line 2—2 of Fig. 1.
Figure 3:
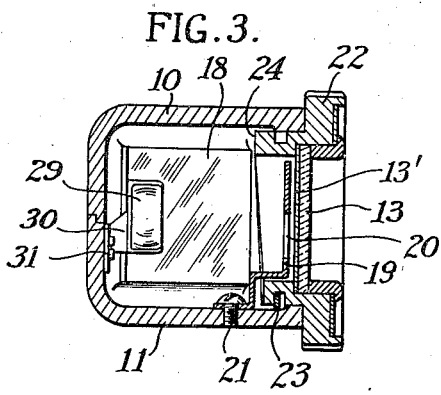
Fig. 3 is a section on line 3—3 of Fig. 1.
Figure 4:
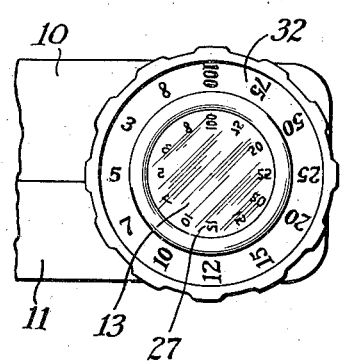
Fig. 4 is a fragmentary view showing the exterior of the adjusting ring of the finder; and, Fig. 5 is a view showing the images of an object field out of alinement as they appear to an observer prior to adjustment of the device.

The range finder as shown in Figs. 1 and 2 comprises a suitable housing consisting of upper and lower sections 10 and 11 respectively which are of a form adapted for die-casting, and the various parts of the finder are so arranged that they may readily be mounted in the lower section 11, after which the upper section 10 may be fitted thereon and secured in any suitable manner. The front wall of the housing is provided with two spaced windows 12 and 13 which constitute the beam accepting apertures of the finder. In the rear wall of the housing and in line with window 12 is mounted an eye-piece window 14. Within the housing and on the bottom wall thereof, pivoted upon a suitable pivot pin or screw 15, is a lever member 16 carrying a mirror 17 arranged at an angle of approximately 45° between the windows 12 and 14 and is so positioned, as shown in Fig. 2, as to mask off the lower half of the window 12 so that the field of view as seen through the eye-piece 14 and the window 12 is the upper half of the two simultaneous images formed by the finder. Securely mounted in the other end of the housing and behind the window 13 is a second mirror 18 which is positioned to reflect the light received through the window 13 onto the mirror 17 and thence out through the eye-piece 14. A mask 19 having a rectangular opening 20 is mounted on the lower half of the casing 11 by means of a suitable screw 21, and the opening 20 is so located in the mask 19 as to be vertically offset with respect to the direct window 12, which is left uncovered by the adjustable mirror 17.

By reason of the fact that the effective openings of the windows 12 and 13 are vertically offset with respect to each other, it will be evident that the two images as viewed through the eye-piece 14 will be vertically adjacent and comprise complementary halves of the complete field of view.

The indirect window 13 is mounted in a flanged retaining ring 22 journaled in the front wall of the housing and its flange is held into engagement with said wall by means of a semi-circular flat spring 23. The ring 22 is rotatable in the housing and has its rearwardly extending end formed with a cam surface 24. The pivoted lever 16 is provided with a cam following end 25 which is held in resilient engagement with the cam 24 by means of a spring member 26 formed integrally with the lever 16 and bearing against the rear wall of the housing.

Immediately behind and preferably in contact with the window 13 is mounted a cover glass 13' which may be of any suitable transparent material. This cover glass may, if desired, be given a distinctive tint or, as will hereinafter appear, may be provided with a graduated scale for indicating the position of the ring 22.

Figure 5:
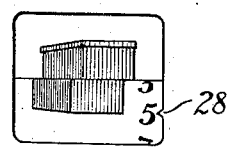

Manual adjustment of the ring 22 rotates the cam surface 24 to alter the angular position of the mirror 17 whereby the two images viewed through the eye-piece may be brought into vertical alinement or registration. Inasmuch as the adjustment of the ring 22 necessary to bring the two images into coincidence or vertical registry is proportional to the distance of the object viewed, this ring may be provided with suitable scales for indicating this distance. Accordingly, the cover glass 13' is provided with a scale 27 which is adapted to cooperate with an index pointer 28 formed in the mask 19, and a small lens element 29 carried by a bracket 30 secured to the housing by a screw 31 is so positioned in the light path between the mirrors 17 and 18 as to bring the scale 27 into the apparent field of view as shown in Figs. 2 and 5. This arrangement permits the observer to read off the distance immediately after adjustment of the finder and without removing it from his eye, so that if so desired he may immediately proceed to determine another distance or distances, such as the nearest and the most distant object which he desires to include within the depth of field of the focus of his camera.

The adjusting ring 22 is also provided on the front face of its flange with a graduated scale 32 so that if desired the distance may be noted after the finder has been removed from the eye of the observer.

The adjustable mirror 17 carried by the pivoted lever 16 is mounted on a small plate 33 provided with a raised embossing 34 which rests for universal movement in a depressed embossing 35 formed in the lever 16. Universal adjustment of this plate 33 and therefore the mirror 17 relatively to the lever 16 is obtained by means of four screws 36 headed in the plate 33 and threaded in tapped holes formed in the lever 16. With this arrangement the mirror 17 may be adjusted in assembling the finders so that the two partial images, as shown in Fig. 5, are neither separated nor overlapped at their dividing line.

For convenience in carrying the finder of this invention, it is provided with pocket clip 37 which is secured to one end of the housing by means of a headed screw 38 which fits into a threaded aperture 39 in the end of the housing. This aperture 39 when the headed screw 38 is removed, makes it possible to secure the finder to a camera so that it at all times will be available for use.

From the above description, it will be clear that the present invention provides a base type range finder of the split field coincidence type which is compact, easy to assemble and adjust, and convenient to use.

When using the range finder of the invention the observer places his eye near the eye-piece 14 and directs the finder to bring into view the object he wishes to photograph or to learn its distance from him. He now rotates the ring 22 until the two images are in vertical coincidence and then reads the scale 27 without removing the finder from his eye, or he may remove the finder and read the object distance from the external scale 32.

Various changes and modifications may be made in the range finder specifically described above without departing from the scope of the invention as described in the appended claims.

What I claim as new and desire to secure by Letters Patent of the United States is:

1. In a range finding device, a housing, two openings spaced in one wall of the housing, a third opening in the opposite wall and in alinement with one of said two openings, whereby an object field may be viewed directly, an arm pivoted in the housing, a mirror mounted on the arm and positioned between said alined openings and extending into the field of view as observed through said third opening, a stationary mirror mounted in the housing to receive light entering the other of said two spaced openings and adapted to direct such light onto said first-mentioned mirror, a rotatable ring mounted in said last-mentioned opening, a cam surface carried by said ring, means for resiliently pressing the pivoted arm against said cam surface, whereby rotation of the ring will adjust the angular position of the mirror on the arm relatively to the stationary mirror, a cover glass mounted in said ring, a scale on said cover glass and a lens element mounted between said two mirrors for bringing said scale into the field of view as observed through said third opening.

2. In a range finding device, an elongated housing containing the base of the range finder, two spaced beam accepting openings in one wall of the housing, means for directing the beam accepted by one of said openings along the base of the finder, an opening constituting an eye-piece in the opposite wall of the housing and in line with the other of the beam accepting openings, means in the housing for deflecting out through the eye-piece the beam directed along the base and so positioned that the field of view as observed through the eye-piece is divided approximately in half in a horizontal direction, each half consisting of a different beam accepted by said spaced openings, means for adjusting said deflecting means to vary the relative positions of the views of said field, a graduated scale positioned in the indirect beam accepting opening and movable with said adjusting means and a lens mounted in said housing and in the path of the beam directed along the base of the finder for bringing said scale into the field of view of an observer looking through said eye-piece.

3. A range finder including means for forming two partial views of a distant object of which views one is observed directly through an eye-piece and an alined window and the other is observed indirectly through the eye-piece and a window to one side of the alined window, two spaced light deflecting elements for directing light from the spaced window to the eye-piece, adjustable means for varying the relative positions of said partial views, a manually operable ring for adjusting said means, a cover glass for said spaced window carried by said ring, a graduated scale on the cover glass, a lens element in the light path between said deflecting elements for making said scale readable through the eye-piece and a graduated scale on said ring adapted to be viewed under separate observation.

JOSEPH MIHALYI.